United States Patent [19]

Lunder et al.

[11] Patent Number: 4,552,769

[45] Date of Patent: Nov. 12, 1985

[54] COLD SOLUBLE TEA

[75] Inventors: Tito L. Lunder; Corine M. Nielsen, both of Lausanne, Switzerland

[73] Assignee: Nestec S.A., Vevey, Switzerland

[21] Appl. No.: 718,165

[22] Filed: Apr. 1, 1985

[51] Int. Cl.$^4$ .............................................. A23F 3/20
[52] U.S. Cl. ..................................... 426/435; 426/597
[58] Field of Search ................................ 426/435, 597

[56] References Cited

U.S. PATENT DOCUMENTS

| | | | |
|---|---|---|---|
| 4,315,036 | 2/1982 | Husaini et al. | 426/597 X |
| 4,472,441 | 9/1984 | Clark et al. | 426/435 X |
| 4,490,402 | 12/1984 | Lunder et al. | 426/435 X |

FOREIGN PATENT DOCUMENTS 559758  3/1944  United Kingdom ................ 426/597

*Primary Examiner*—Joseph Golian
*Attorney, Agent, or Firm*—Vogt and O'Donnell

[57] ABSTRACT

A process for preparing a powdered tea extract characterized in that black tea leaves are extracted with hot water to give a first extract which is separated from the tea leaves, concentrated to a solids content of from 5% to 12.5%, and then cooled to a temperature from 5° C. to 15° C. to form an insoluble cream which is separated from the concentrated first extract and then extracted with water at a temperature of from 40° C. to 70° C. to give a second extract which is separated from the remaining insoluble cream, after which the first and second extracts are mixed and dried.

4 Claims, No Drawings

COLD SOLUBLE TEA

The present invention relates to a process for the production of a cold soluble tea product and more particularly to the production of a powdered tea extract which is readily and completely soluble in cold water.

The traditional methods of producing instant tea, which usually consist of the steps of hot-water extraction, aroma processing, dehazing and drying, do not give cold soluble powders. For example, black tea extracts, and especially instant black tea, when made to beverage concentration become turbid if the beverage is allowed to cool to room temperature or below. This turbidity is caused by a precipitate of a complex between caffeine and polyphenols which in the trade is normally referred to as "tea cream". This tea cream which is extracted by the hot-water is insoluble in cold-water and the achievement of cold-water solubility usually necessitates some additional processing of the extracted tea. This additional processing may involve simply cooling the hot aqueous tea extract to precipitate the cold-water insoluble tea cream and discarding it, or it may involve the solubilisation of the cold-water insoluble tea cream by chemicals or enzymes. However, in the former method, discarding all the precipitated tea cream results in discarding disproportionately large amounts of tea solids (up to 25%) including tannins, the black tea colour and the physiologically active principle of tea, namely, caffeine. In the latter method the reconstituted beverage is very foamy and has exceedingly poor stability, palatability and drinking properties.

At the present time, there is a desire to produce completely natural tea extracts i.e. tea extracts which are prepared without the addition of any chemicals. For instance, it has been proposed to extract the tea leaves with cold, rather than with hot water in order to achieve cold-water solubility. Although the cold-water insoluble teacream is not extracted during cold-water extraction and the reconstituted beverage is substantially cold-water soluble, the yield is very low.

One method of producing a cold soluble tea extract which does not involve the use of any chemical additives is described in British Pat. No. 559,758. In this method, a cold extract of dry tea is made at a temperature between 10° C. and 25° C., and then the same tea leaves are used again for the preparation of a hot infusion with water which is boiling or nearly boiling, both extracts are dehydrated so as to produce semi-liquid or solid extracts which are blended in desired proportions. However, a disadvantage of such a method is that the time required for the cold-water extraction is stated to be quite long, for instance from 4 to 24 hours. Such extraction times are not economically feasible and, in any case, the tea extracts produced are not completely soluble in water at 10° C.

We have now developed a novel process for preparing a completely natural powdered tea extract soluble in cold-water at 10° C. which involves hot extraction and a partial elimination of the tea cream, in which process, surprisingly, the drawback of excessive loss of valuable tea solids is overcome.

According to the present invention, there is provided a process for preparing a powdered tea extract characterised in that black tea leaves are extracted with hot-water to give a first extract which is separated from the tea leaves, concentrated to a solids content of from 5% to 12.5%, and then cooled to a temperature from 5° C. to 15° C. to form an insoluble cream which is separated from the concentrated first extract and then extracted with water at a temperature of from 40° C. to 70° C. to give a second extract which is separated from the remaining insoluble cream, after which the first and second extracts are mixed and dried.

The amount of water used for each extraction may be from 2 to 25 parts by weight, preferably from 4 to 15 parts by weight and especially from 5 to 12 parts by weight per part by weight of solid matter. The duration of each extraction is conventional, for instance up to 30 minutes, preferably from 2 to 15 minutes and especially from 5 to 12.5 minutes.

The temperature of the water used for the extraction of the tea leaves may be any temperature conventionally used for the hot extraction of tea leaves, for instance, from 60° C. to 130° C., preferably from 75° C. to 120° C. and especially from 85° C. to 110° C.

The first extract is conveniently concentrated under vacuum, preferably to a solids content of from 6% to 11% and especially from 7% to 9%. After concentration, the first extract is cooled to form the cream, preferably to a temperature from 7.5° C. to 12.5° C. and especially from 9° C. to 11° C. The formed cream is separated from the first extract before being extracted with water at a temperature from 40° C. to 70° C. whereby tea cream soluble in water at such temperatures dissolves in the water and the second extract, having dissolved therein such soluble tea cream, is separated from the remaining insoluble tea cream. The preferred extraction temperature of the tea cream is from 45° C. to 65° C. and especially from 50° C. to 60° C. The separation of the cream from both extracts is conveniently carried out by filtering or centrifuging.

The first extraction may be carried out batchwise or countercurrently while the second extraction is most conveniently carried out batchwise. Batchwise extraction is preferably carried out with agitation such as stirring in a vessel which contains water and the solid material i.e. the tea leaves or the tea cream. In a countercurrent process the water flows countercurrently through a plurality of cells containing the tea leaves.

The manner of separation of the extract from the tea leaves after extraction depends on whether the process is batchwise or countercurrent. In a batchwise process the separation may suitably be carried out by filtering or centrifuging while in a countercurrent process the separation may be achieved by drawing off the extract from the cell containing the least exhausted tea leaves.

The first and second extracts are then mixed and generally the extracts are concentrated to the desired soluble solids content before being dried, for example, by freeze-drying or spray-drying.

The present invention is applicable to all kinds of black tea and their blends.

The powdered extract obtained in accordance with the present invention is a completely natural 100% tea product, instantly soluble in cold-water at 10° C. which can then be iced and provides beverages having good stability, palatability and drinking qualities including a desirable reduced astringency.

The following Examples further illustrate the present invention.

EXAMPLE 1

150 kg deionised water which had been heated to 95° C. was poured into a vessel containing 10 kg black tea leaves and the mixture extracted for 10 minutes. The hot extract was separated by filtration and then concentrated under vacuum until the solids content was 8% and then cooled down to 10° C. At this temperature insoluble tea cream formed and was separated by centrifugation from the supernatant (1).

The separated tea cream was poured into 10 kg of deionised water at 60° C., stirred for 10 minutes and centrifuged to separate the residue which contained cold-water insoluble solids from the supernatant (2).

Supernatant (1) was mixed with supernatant (2), concentrated to a suitable solids content and spray-dried to give a powdered extract which was completely soluble in water cooled down to 10° C. The powdered extract was 100% natural.

EXAMPLE 2

By repeating the procedure described in Example 1 but pouring the separated tea cream into deionised water at 50° C. instead of 60° C., the powdered extract obtained was completely soluble in water cooled down to 10° C.

We claim:

1. A process for preparing a powdered tea extract characterised in that black tea leaves are extracted with hot-water to give a first extract which is separated from the tea leaves, concentrated to a solids content of from 5% to 12.5%, and then cooled to a temperature from 5° C. to 15° C. to form an insoluble cream which is separated from the concentrated first extract and then extracted with water at a temperature of from 40° C. to 70° C. to give a second extract which is separated from the remaining insoluble cream, after which the first and second extracts are mixed and dried.

2. A process according to claim 1 characterised in that the amount of water used for each extraction is from 5 to 12 parts by weight per part by weight of solid matter.

3. A process according to claim 1 characterised in that the temperature used for the extraction of the tea leaves is from 85° C. to 110° C.

4. A process according to claim 1 characterised in that temperature of the extraction of the tea cream is from 45° C. to 65° C.

* * * * *